(12) United States Patent
Tan et al.

(10) Patent No.: US 10,794,136 B2
(45) Date of Patent: Oct. 6, 2020

(54) REVERSE ROTARY SPRINKLER DRILLING PIPE SYSTEM WITH ANTI-STICKING FUNCTION AND ITS APPLICATION METHOD

(71) Applicant: SHANDONG UNIVERSITY OF SCIENCE AND TECHNOLOGY, Qingdao (CN)

(72) Inventors: Yunliang Tan, Qingdao (CN); Xuesheng Liu, Qingdao (CN); Deyuan Fan, Qingdao (CN); Jianguo Ning, Qingdao (CN); Qiang Xu, Qingdao (CN); Bangyou Jiang, Qingdao (CN); Guangchao Zhang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 16/495,800

(22) PCT Filed: Feb. 28, 2019

(86) PCT No.: PCT/CN2019/076559
§ 371 (c)(1),
(2) Date: Sep. 19, 2019

(87) PCT Pub. No.: WO2019/170033
PCT Pub. Date: Sep. 12, 2019

(65) Prior Publication Data
US 2020/0024925 A1 Jan. 23, 2020

(30) Foreign Application Priority Data

Jun. 25, 2018 (CN) .......................... 2018 1 0649675

(51) Int. Cl.
*E21B 31/03* (2006.01)
*E21B 17/22* (2006.01)
*E21B 17/00* (2006.01)

(52) U.S. Cl.
CPC .............. *E21B 31/03* (2013.01); *E21B 17/22* (2013.01); *E21B 17/006* (2013.01)

(58) Field of Classification Search
CPC ........... E21B 31/03; E21B 37/00; E21B 21/00
See application file for complete search history.

(56) References Cited

U.S. PATENT DOCUMENTS 3,268,003 A * 8/1966 Essary .................... E21B 31/03
166/284

* cited by examiner

*Primary Examiner* — Kristyn A Hall
(74) *Attorney, Agent, or Firm* — CBM Patent Consulting, LLC

(57) ABSTRACT

A reverse rotary sprinkler drilling pipe system with anti-sticking function and its application method. This system comprises the front and rear drilling pipes which are arranged in sequence, a water spraying device, a rotary device. The rear drilling pipe is connected with an external drilling rig. The front and rear drilling pipes are respectively arranged with through holes in an inner axial direction. The water spraying device comprises a first cylinder and a connecting body, and symmetrical multiple groups of water spraying holes are arranged on the inner sidewall of the first cylinder. A limit block is arranged in the upper part of the inner sidewall. The connecting body is disposed with water conveyance hole which is connected with the through hole and the inner part of the first cylinder.

8 Claims, 7 Drawing Sheets

REVERSE ROTARY SPRINKLER DRILLING PIPE SYSTEM WITH ANTI-STICKING FUNCTION AND ITS APPLICATION METHOD

TECHNICAL FIELD

The invention relates to the field of drilling construction equipment, and in particular to a reverse rotary sprinkler drilling pipe system with anti-sticking function and its application method.

TECHNICAL BACKGROUND

Drilling construction refers to the operation of drilling boreholes on geological body by connecting drilling pipes to rigs in the engineering site. At present, drilling construction is widely used in geotechnical engineering such as coal mine gas drainage, water injection and drainage, geological exploration, borehole pressure relief and slope anchorage. In the drilling construction, drilling cuttings accumulated in the borehole and can not be discharged in time with the drilling depth increase. This lead to problems such as drill pipe unable to rotate, sticking and even burying or dropping. Once the sticking occurs, it will not only cause the damage of drilling pipe and reduce the service life of drilling tools, but also directly affect the progress of drilling construction and work efficiency.

In order to solve the above problems, Chinese patent No. 201310051709.X disclosed a sleeve device and drilling method for anti-collapse borehole. It is to drill the sleeve together with the drill pipe, and then withdraw the twist drilling pipe from the inside of the sleeve, leaving the sleeve in the borehole. This method avoid the difficulties in sticking and withdrawing caused by borehole collapse to a certain extent. However, the construction of this design is complex, and the drilling efficiency is low. Moreover, the sleeve is left in the borehole, which not only wastes materials, but also increases the cost of drilling construction.

In the existing technology, there was also an anti-sticking drilling pipe protection structure (patent No. 201711331508.X) and an anti-sticking drilling pipe structure disclosed by Chinese patent No. 201510012163.6. Both of them are designed to clean up the borehole with high pressure gas in the closed chambers and take the drilling cuttings out of the borehole. However, these devices are only suitable for cleaning a small amount of drilling cuttings and can not remove the hard rocks that cause sticking. Additionally, the gas pressure will weaken when there are cracks in the borehole or the drilling distance is long. In this case, the drilling cuttings can not be discharged from the borehole effectively.

In addition, the drilling pipes disclosed in the above two patents can only rotate in one direction. This kind of drilling pipes are prone to stick by gangues or borehole collapse when drilling in soft and gangue-containing coal seam.

In order to solve the above problems caused by unidirectional drilling pipes, there is a kind of drilling pipe system which can rotate in two directions, such as:

Chinese patent No. 2012103213759 discloses a forward-reversal rotation connecting device for drilling pipe used in drilling rigs in coal mines. It is provided with a connecting device between the drilling pipe and the drilling bit, and the connecting device is composed of first and second external splines and inner spline sleeves and spring cylindrical pins. The patent can solve some minor sticking of drilling pipes, but the incision of splines is affected by strong dynamic loads and is prone to fatigue fracture under the high rotation speed. In addition, the spline manufacturing process is complex, and requires special equipment, which increases the production costs.

Chinese patent No. 2012103213759 discloses a thread-connected spiral drilling pipes reversing extraction device. It consists of at least 2 spiral drilling pipes connected by thread, and the threaded joints between the drilling pipes are fixed by keyway and bayonet lock. Although this device can realize the forward-reversal rotation when the drilling pipes are stuck, the water ejected from drilling bit is used for wet drilling construction. However, with the drilling depth increase, sticking often occurs at locations other than drilling bit. And there is no water spout on the drilling pipe body, even if it is reversed, the drill cuttings in borehole can not be discharged in time, which cause some problems such as the drilling pipe unable to rotate, sticking and so on. Although the water ejected from the drilling bit can also bring out the drilling cuttings, it will take a very long time. Especially when drilling the deep borehole, the effect is poor and the problems like sticking, burying and dropping drilling pipes can not be solved thoroughly.

Therefore, the prior technology needs further improvement and development.

Invention Contents

In view of the shortcomings of the prior technology, we intend to provide a reverse rotary sprinkler drilling pipe system with anti-sticking function and its application method, which can be used to solve the problems of sticking, burying and dropping of drilling pipes in the drilling construction.

The object of the invention can be realized by the following technical solutions:

A reverse rotary sprinkler drilling pipe system with anti-sticking function comprises the front and rear drilling pipes which are arranged in sequence, a water spraying device, a rotary device. The rear drilling pipe is connected with an external drilling rig.

The front and rear drilling pipes are respectively arranged with through holes in an inner axial direction.

The water spraying device comprises a first cylinder and a connecting body which is fixedly connected with the front drilling pipe. Symmetrical multiple groups of water spraying holes are arranged on the inner sidewall of the first cylinder, and a limit block is arranged in the upper part of the inner sidewall. The connecting body is disposed with water conveyance hole which is connected with the through hole and the inner part of the first cylinder.

A rotary device comprises a connected second cylinder and an annular partition, and the second cylinder is fixedly connected with the rear drilling pipe. The free end of the annular partition extends into the interior of the first cylinder and is rotatably coupled to the first cylinder. The annular partition is also arranged with an opening, and the limit block of the water spraying device is located in it.

The limit block is used to limit rotation of the annular partition to working position or cleaning position, which relative to the first cylinder. When in the working position, the annular partition blocks the water spraying holes; when in the cleaning position, the opening of the annular partition communicates with the water spraying holes.

Furthermore, an annular protrusion is disposed on an inner sidewall of the first cylinder. A rotary card slot is arranged on the upper outer surface of the annular partition, which matches with the annular protrusion.

Furtherly, the connecting body is a metal square cylinder, which is fixedly connected with the front drilling pipe through a screw bolt.

Furtherly, the outer surface of the second cylinder is arranged with a plurality of cutting teeth, each of which is the outward circular truncated cone.

Furtherly, the inner gasket is arranged on the top of inner sidewall of the second cylinder, and the outer gasket is at the bottom of the second cylinder. The inner and outer gaskets are fixed on the second cylinder through two-liquid mixed hardening glue.

The invention provides an application method of a reverse rotary sprinkler drilling pipe system with anti-sticking function, which comprises the following steps:

S1. Start the drilling rig to make the rear drill pipe rotate forward and drive annular partition of the rotary device to rotate. The annular partition blocks the water spraying holes through the restriction function of the limit block and then drives the front drilling pipe to rotate.

S2. When the drilling pipe is sticking in the forward rotation, reverse rotation after stopping the rig, so that the annular partition rotates backward until it contacts the other side of the limit block. At this time, the opening of the annular partition is connected with the water spraying holes, and the clean water is ejected through the water spraying holes and the drilling bit.

Furtherly, in the S2, when the drilling rig stops and rotates backwards, the cutting teeth on the rotary device will loosen or destroy the hard rocks in the borehole.

Furtherly, following the S2, it also includes:

S3. When the reverse rotation is unable to release the sticking, the rotation direction of the drilling rig can changed by setting interval time to make the front and rear drill pipes rotate forward or forward and backward alternately.

Furtherly, the interval time is generally 5-20 S.

The advantages of this invention lie in:

1. The invention provides torque by drilling rig to drive the rotation of rear drilling pipe and transmits it to the rotary device. Then, the annular partition of the rotary device cooperates with the limit block of the water spraying device, so that the torque continues to be transmitted to the front drilling pipe. When the drilling rig is in the working position, the annular partition blocks the water spraying holes. And the clean water can flow water conveyance hole and through hole into the drilling bit position to perform the wet drilling construction. When the sticking occurs, the drilling rig is reversed to the cleaning position. At this time, the opening of the annular partition communicates with the water spraying holes, so that the clean water can be ejected simultaneously from the water spraying holes and the drilling bit. In this way, sticking can be treated quickly and timely to achieve the purpose of cleaning drilling cuttings, even in deep borehole.

2. The invention utilizes the mutual cooperation of square pin and square hole and fixed by screw bolt, so that the drilling pipe can realize forward and backward rotation. This design has high stability with simple structure and low cost.

3. Forward and backward alternating rotation of drilling pipe, the cutting teeth on the rotary device, and water from water spraying holes cooperate with each other. This invention can quickly loosen the accumulated drilling cuttings, destroy the hard rocks bring them out the borehole in the process of withdrawing. It effectively prevents the burying, sticking and dropping problems in drilling construction.

4. This device has convenient operation and high feasibility, which greatly improves the speed and working efficiency of drilling construction.

DESCRIPTION OF FIGURES

In order to illustrate the implementation of the invention or the prior technology more clearly, the figures used in the invention will be briefly described below.

Figure 1:
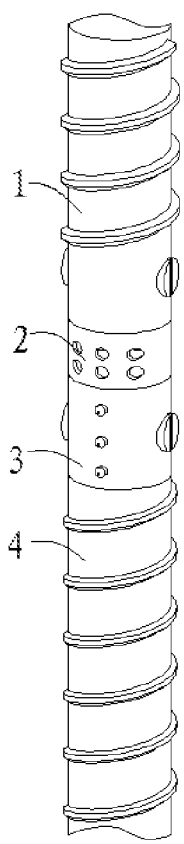
FIG. 1 is a structural schematic of a reverse rotary sprinkler drilling pipe system with anti-sticking function.
Figure 2:
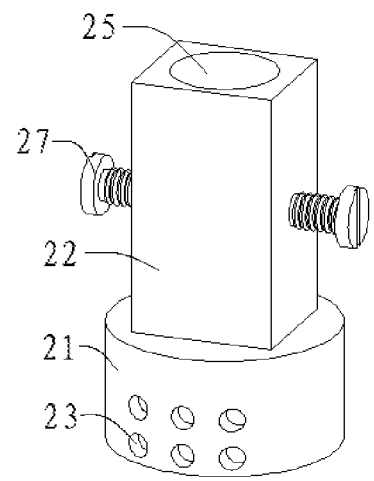
FIG. 2 is a structural schematic of the water spraying device of a reverse rotary sprinkler drilling pipe system with anti-sticking function.
Figure 3:
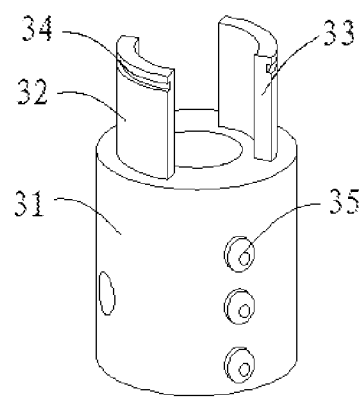
FIG. 3 is a structural schematic of the rotary device of a reverse rotary sprinkler drilling pipe system with anti-sticking function.
Figure 4:
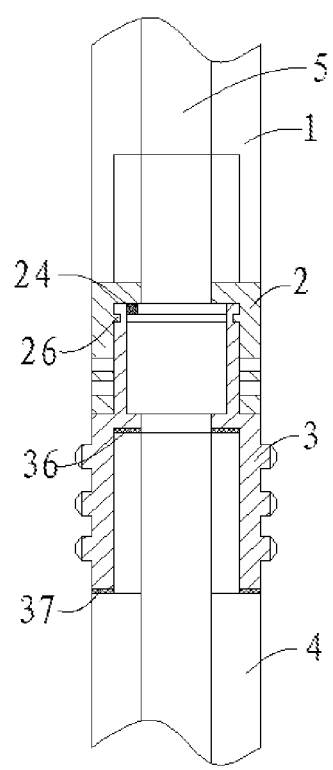
FIG. 4 is a structural schematic of the working position of a reverse rotary sprinkler drilling pipe system with anti-sticking function.
Figure 5:
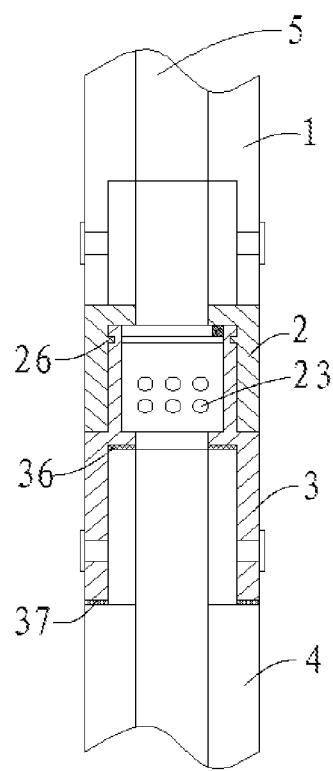
FIG. 5 is a structural schematic of the cleaning position of a reverse rotary sprinkler drilling pipe system with anti-sticking function.
Figure 6:
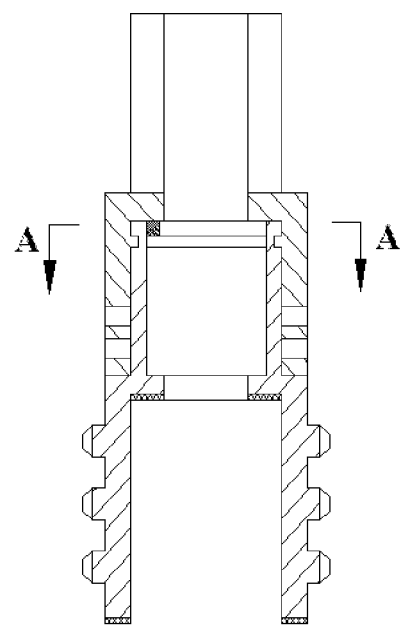
FIG. 6 is a cross-section of the connection between the water spraying device and the rotary device during the forward rotation of a reverse rotary sprinkler drilling pipe system with anti-sticking function.
Figure 7:
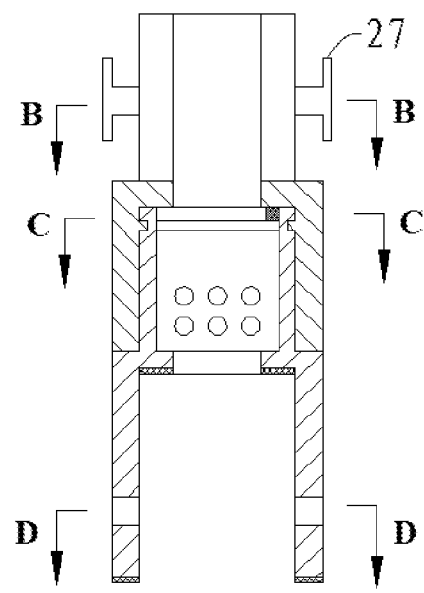
FIG. 7 is a cross-section of the connection between the water spraying device and the rotary device during the backward rotation of a reverse rotary sprinkler drilling pipe system with anti-sticking function.
Figure 8:
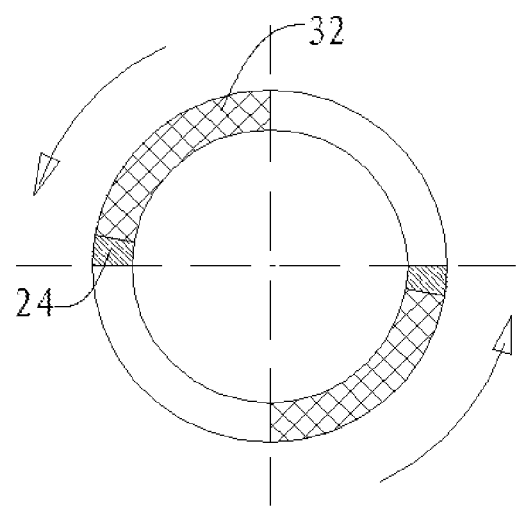
FIG. 8 is a cross-section along the A-A line of FIG. 6.
Figure 9:
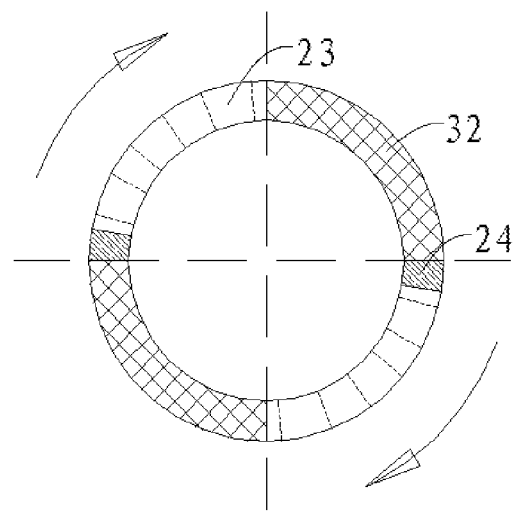
FIG. 9 is a cross-section along the C-C line of FIG. 7.
Figure 10:
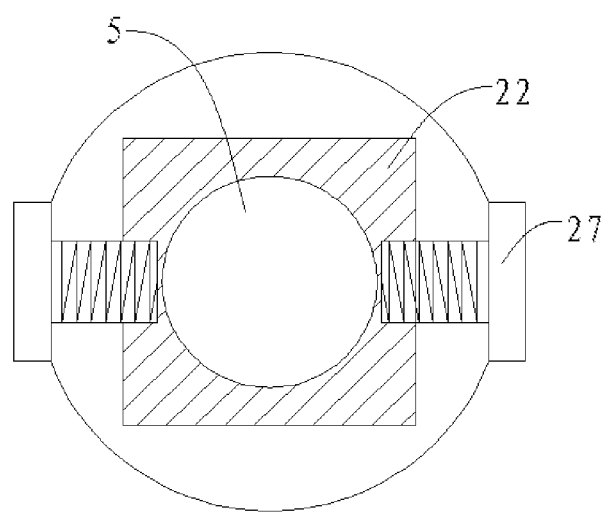
FIG. 10 is a cross-section along the B-B line of FIG. 7.
Figure 11:
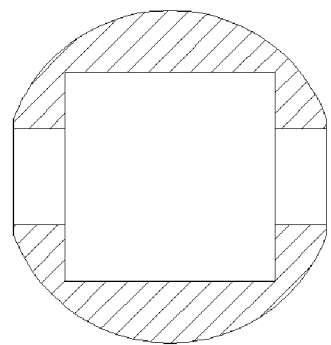
FIG. 11 is a cross-section along the D-D line of FIG. 7.

In the figures: 1—front drilling pipe, 2—water spraying device, 21—first cylinder, 22—connecting body, 23—water spraying hole, 24—limit block, 25—water conveyance hole, 26—annular protrusion, 27—screw bolt, 3—rotary device, 31—second cylinder, 32—annular partition, 33—opening, 34—rotary card slot, 35—cutting teeth, 36—inner gasket, 37—outer gasket, 4—rear drilling pipe, 5—through hole.

DETAIL IMPLEMENTATION METHOD

The preferred implementation detail of the invention is described based on the figures, to make the advantages and features of the invention easier to be understood by those skilled in the field. Thus, the protections cope of the invention can be defined more clearly.

As shown in FIGS. 1-11, this invention provide a reverse rotary sprinkler drilling pipe system with anti-sticking function. It comprises the front drilling pipe 1, a water spraying device 2, a rotary device 3, and the rear drilling pipe 4 the rear drilling pipe 4 is connected to an external drilling rig (not shown in the figures) which is used to provide torque to drive the rear drill pipe 4 to rotate.

The front drilling pipe 1 and rear drilling pipe 4 are respectively arranged with through holes 5 in an inner axial direction. The through holes 5 serve as a transportation channel for clean water.

The water spraying device 2 comprises a first cylinder 21 and a connecting body 22, symmetrical multiple groups of water spraying holes 23 are arranged on the inner sidewall of the first cylinder 21, and a limit block 24 is arranged in the upper part of the inner sidewall. The connecting body 22 is disposed with water conveyance hole 25 which is connected with the through hole 5 and the inner part of the first cylinder 21.

A rotary device 3 comprises a connected second cylinder 31 and an annular partition 32, and the second cylinder 31 is fixedly connected with the rear drilling pipe 4. The free end of the annular partition 32 extends into the interior of the first cylinder 21 and is rotatably coupled to the first cylinder 21. The annular partition 32 is also arranged with an opening 33, and the limit block 24 is located in it. In the implementation, in order to ensure that clean water can flow uniformly into the water spraying holes 23 through the opening 33, the size of the opening 33 should match the distribution area of the water spraying holes 23. Preferably, the annular partition 32 is divided into two circular arc plates by opening 33, and two circular arc plates form a semi-circular arc. What is more, the limit block 24 is consist of two blocks. The distribution area of the water spraying holes 23 in the first cylinder 21 is also half cylinder, and the maximum rotation angle of the two arc plates is 45°. The limit block 24 is used to restrict the rotation of annular partition 32 to working or cleaning position relative to the first cylinder 21. In the working position, the annular partition 32 blocks the water spraying holes 23. In the cleaning position, the opening 33 of the annular partition 32 communicates with the water spraying holes 23.

The invention provides torque by drilling rig to drive the rotation of rear drilling pipe 4 and transmits it to the rotary device 3. Then, the annular partition 32 of the rotary device 3 cooperates with the limit block 24 of the water spraying device 2, so that the torque continues to be transmitted to the front drilling pipe 1. When the drilling rig is in the working position, the annular partition 32 blocks the water spraying holes 23. And the clean water can flow water conveyance hole 25 and through hole 5 into the drilling bit. When the drilling rig is reversed to the cleaning position, the opening 33 of the annular partition 32 communicates with the water spraying holes 23, so that the clean water can be ejected simultaneously from the water spraying holes 23. In this way, sticking can be treated quickly and timely to achieve the purpose of cleaning drilling cuttings. At the same time, the invention also has the advantages of convenient operation, fast drilling speed and high working efficiency during drilling construction.

Specifically, an annular protrusion 26 is disposed on an inner sidewall of the first cylinder 21. A rotary card slot 34 is arranged on the upper outer surface of the annular partition 32, which matches with the annular protrusion 26. In the invention, the relative rotation of the annular partition 32 and the first cylinder 21 can be realized by the mutual cooperation of the rotary card slot 34 and the annular protrusion 26.

Preferably, in order to improve the connection stability of the connecting body 22 and the front drilling pipe 1, the connecting body 22 is a metal square cylinder, which is fixedly connected with the front drilling pipe 1 through a screw bolt 27.

In the invention, the outer surface of the second cylinder 31 is arranged with a plurality of cutting teeth 35, each of which is the outward circular truncated cone. When the second cylinder 31 rotates, the cutting teeth 35 can loosen and destroy the hard rocks in the borehole to solve the sticking problem.

Figure 12:
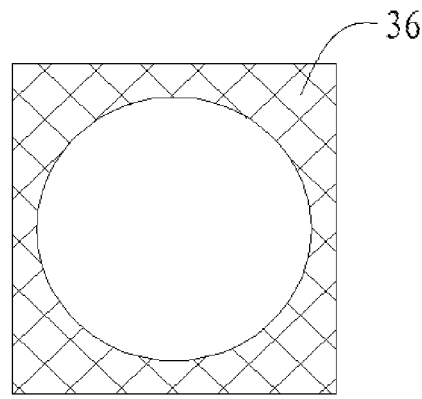
FIG. 12 is a structural schematic of the inner gasket of a reverse rotary sprinkler drilling pipe system with anti-sticking function.
Figure 13:
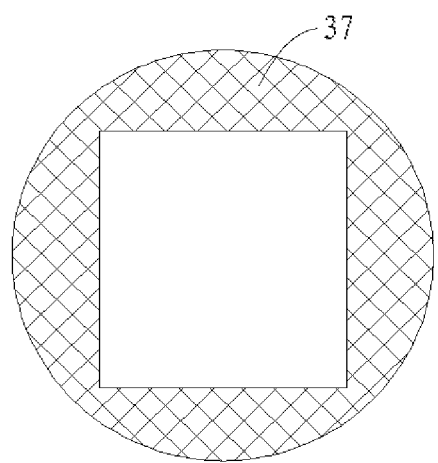
FIG. 13 is a structural schematic of the outer gasket of a reverse rotary sprinkler drilling pipe system with anti-sticking function.

As shown in FIGS. 12-13, in order to improve sealability, the inner gasket 36 is arranged on the top of inner sidewall of the second cylinder 31, and the outer gasket 37 is at the bottom of the second cylinder 31. The inner and outer gaskets are fixed on the second cylinder 31 through two-liquid mixed hardening glue.

The invention provides an application method of a reverse rotary sprinkler drilling pipe system with anti-sticking function, which comprises the following steps:

S1. Start the drilling rig to make the rear drill pipe 4 rotate forward and drive annular partition 32 of the rotary device 3 to rotate. The annular partition blocks the water spraying holes 23 through the restriction function of the limit block 24 and then drives the front drilling pipe 1 to rotate.

S2. When the drilling pipe is sticking in the forward rotation, reverse rotation after stopping the rig, so that the annular partition 32 rotates backward until it contacts the other side of the limit block 24. At this time, the opening 33 of the annular partition 32 is connected with the water spraying holes 23, and the clean water is ejected through the water spraying holes 23 to clean the drilling cuttings in the borehole.

In the S2, when the drilling rig stops and rotates backwards, the cutting teeth 35 on the rotary device 3 will loosen or destroy the hard rocks in the borehole.

Following the S2, it also includes:

When the reverse rotation is unable to release the sticking, the rotation direction of the drilling rig can changed by setting interval time to make the front and rear drill pipes rotate forward or forward and backward alternately. Preferably, the interval time is generally 5-20 S.

The above is only a detail implementation of the invention, but the protection scope is not limited thereto. Any changes or substitutions without creative work shall be covered within the protection scope of the invention. Therefore, the protection scope of the invention should be limited by the protection scope as defined in the claims.

What is claimed is:

1. A reverse rotary sprinkler drilling pipe system with anti-sticking function comprises the front and rear drilling pipes which are arranged in sequence, a water spraying device, a rotary device; the rear drilling pipe is connected with an external drilling rig;

both of the front and rear drilling pipes are arranged with through holes in an inner axial direction;

the water spraying device comprises a first cylinder and a connecting body which is fixedly connected with the front drilling pipe, multiple groups of water spraying holes are symmetrically arranged on an inner sidewall of the first cylinder, and a limit block is arranged in the upper part of the inner sidewall, the connecting body is disposed with water conveyance hole which is connected with the through hole and the inner part of the first cylinder;

the rotary device comprises a connected second cylinder and an annular partition, and the second cylinder is fixedly connected with the rear drilling pipe, the free end of the annular partition extends into the interior of the first cylinder and is rotatably coupled to the first cylinder, the annular partition is also arranged with an opening, and the limit block of the water spraying device is located in it;

the limit block is used to limit rotation of the annular partition from the first cylinder to a working position or a cleaning position, when in the working position, the annular partition blocks the water spraying holes; when in the cleaning position, the opening of the annular partition communicates with the water spraying holes.

2. The system according to claim 1, an annular protrusion is disposed on the inner sidewall of the first cylinder, a rotary card slot is arranged on the upper outer surface of the annular partition; the rotary card slot matches with the annular protrusion.

3. The system according to claim 2, the connecting body is a metal square cylinder, which is fixedly connected with the front drilling pipe by a screw bolt.

4. The system according to claim 1, the outer surface of the second cylinder is arranged with a plurality of cutting teeth, each of which is an outward circular truncated cone.

5. The system according to claim 1, an inner gasket is arranged on the top of an inner sidewall of the second cylinder, and an outer gasket is at the bottom of the second cylinder, the inner and outer gaskets are fixed on the second cylinder through two-liquid mixed hardening glue.

6. A method of using the reverse rotary sprinkler drilling pipe system with anti-sticking function of claim 1, comprising the following steps:
   (1) start the drilling rig to make the rear drill pipe rotate forward and drive the annular partition of the rotary device to rotate, the annular partition blocks the water spraying holes by the limit block and then drives the front drilling pipe to rotate;
   (2) when the drilling pipe is sticking in the forward rotation, reverse rotation after stopping the rig, so that the annular partition rotates backward until the annular partition contacts an other side of the limit block, at this time, the opening of the annular partition is connected with the water spraying holes, and a clean water is ejected through the water spraying holes and a drilling bit.

7. The method according to claim 6, in the step (2), when the drilling rig stops and rotates backwards, the cutting teeth on the rotary device will loosen or destroy hard rocks in the borehole.

8. The method according to claim 6, following the step (2) the method further includes:
   (3) when the reverse rotation is unable to release the sticking, the rotation direction of the drilling rig can be changed by setting interval time to make the front and rear drill pipes rotate forward or forward and backward alternately.

\* \* \* \* \*